United States Patent [19]
Miller

[11] Patent Number: 5,353,553
[45] Date of Patent: Oct. 11, 1994

[54] METHOD AND APPARATUS FOR TREATING BRAKE ROTORS

[75] Inventor: William R. Miller, Jackson, Mich.

[73] Assignee: Miller Industrial Products, Jackson, Mich.

[21] Appl. No.: 179,264

[22] Filed: Jan. 10, 1994

[51] Int. Cl.$^5$ ............................................. B24B 7/17
[52] U.S. Cl. .............................. 451/32; 451/63; 451/106; 451/259
[58] Field of Search ............... 51/281 SF, 328, 118, 51/117, 132, 259, 109 R, DIG. 3, 352, 354, 332, 334

[56] References Cited

U.S. PATENT DOCUMENTS

| | | | |
|---|---|---|---|
| 3,384,915 | 5/1968 | Rands | 15/179 |
| 3,456,401 | 7/1969 | Kushmuk | 51/259 |
| 3,500,589 | 3/1970 | Ellege | 51/132 |
| 3,696,563 | 10/1972 | Rands | 51/332 |
| 3,871,139 | 3/1975 | Rands | 51/334 |
| 4,286,416 | 9/1981 | Cooper, Jr. | 51/334 |
| 4,361,988 | 12/1982 | Gramlich | 51/281 SF |
| 5,152,104 | 10/1992 | Wood et al. | 51/281 SF |

*Primary Examiner*—Robert A. Rose
*Attorney, Agent, or Firm*—Beaman & Beaman

[57] ABSTRACT

The method and apparatus for honing and treating the pad engaging surfaces of vehicle brake rotors or discs consisting of engaging the rotor surface with a plurality of moving abrasive elements mounted upon flexible resilient stems wherein a smooth finished surface is formed. The abrasive elements are rotated about an axis which may be coincident with the brake rotor axis of rotation during machining, or may be offset and parallel thereto, to produce a basket weave machining pattern. A plurality of hone holders may be used when the hone axis of rotation is offset relative to the rotor axis whereby both of the rotor's surfaces may be simultaneously finished. The practice of the invention also permits the braking surfaces of aluminum alloy rotors to be oxidized to form a hard, wear resistant finish thereon.

14 Claims, 1 Drawing Sheet

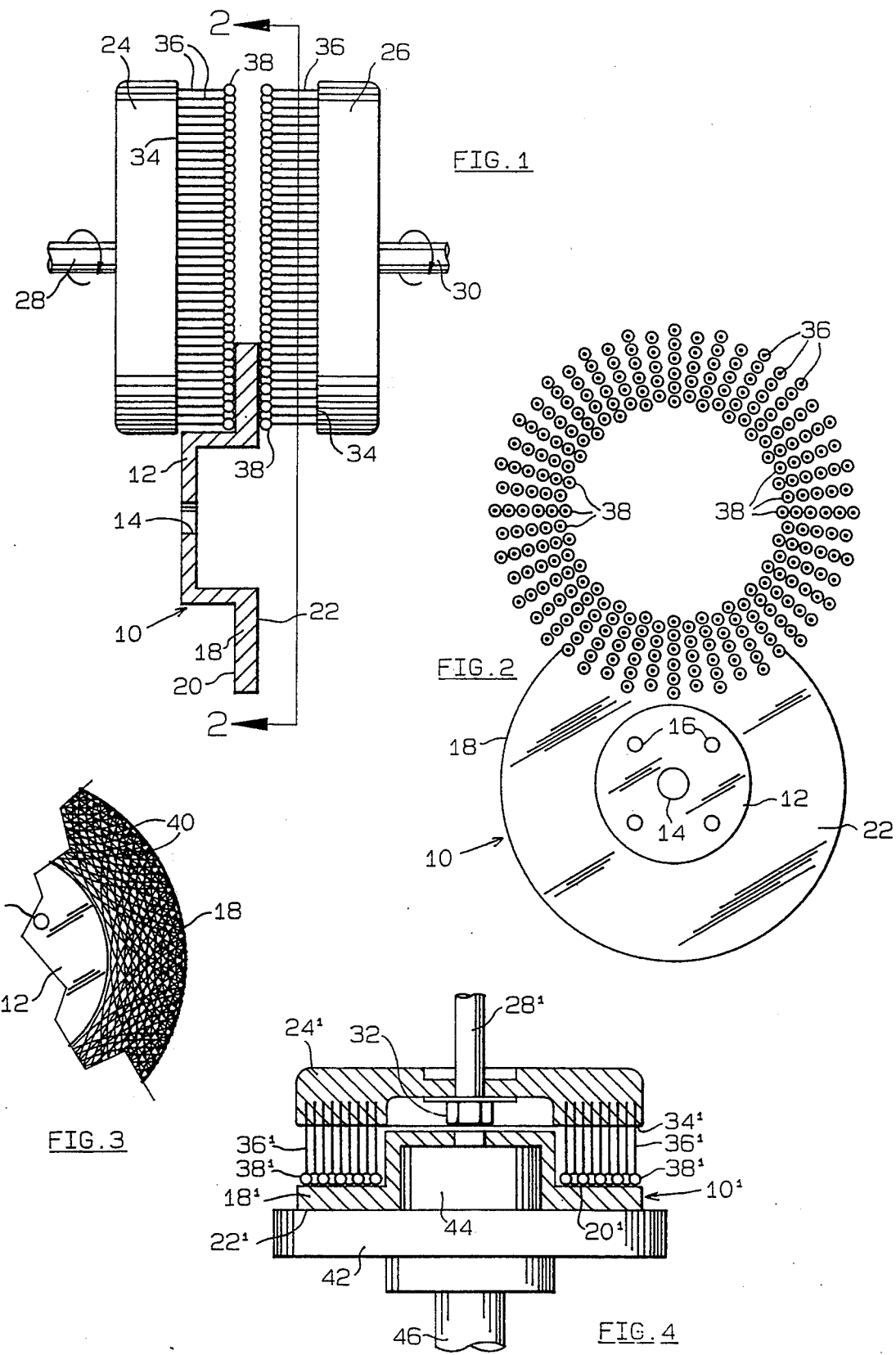

METHOD AND APPARATUS FOR TREATING BRAKE ROTORS

BACKGROUND OF THE INVENTION

1. Field of the Invention

The invention pertains to a method and apparatus for honing the pad engaging surfaces for vehicle brake rotors wherein superior finish characteristics are attained and wherein a wear resistant surface is produced.

2. Description of the Related Art

Vehicle brake rotors or drums basically consist of a hub attached to the vehicle wheel rotatable about the wheel axis of rotation. A radially extending flange depending from the hub periphery includes opposed finished surfaces engageable by the brake pads mounted in a caliper extending over the flange. The brake pads are hydraulically operated to selectively engage the rotor surfaces in a frictional manner to brake the vehicle wheels.

To prevent excessive pad wear, the rotor pad engaging surfaces must be relatively smooth, and are ground, turned or otherwise machined. As vehicle brake rotors are usually formed of a high strength aluminum alloy, it is important that the finishing operation produce the desired smoothness without galling, and difficulty has been encountered in achieving the desired brake rotor pad engaging finish.

High strength aluminum alloy brake rotor surfaces will, during the normal course of wear and engagement by the brake pad, usually form a thin oxidized surface layer resistant to wear. This oxidized layer directly engages the pads, and results from the high temperatures resulting from the frictional engagement of the brake rotor surface and brake pad. In current practice, the brake rotor is not initially provided with this wear resistant oxidized layer, and its existence is haphazardly achieved by the heat generated during braking. In some instances, rather than an oxidized wear resistant layer being formed upon the rotor braking surface, a galling occurs between the surface and the brake pad which prevents the formation of the oxidized layer, and produces a roughness which accelerates the brake pad wear requiring premature pad replacement.

OBJECTS OF THE INVENTION

It is an object of the invention to provide a method for honing vehicle brake rotors using abrasive elements mounted upon flexible stems wherein the pressure of engagement between the abrasive elements and brake rotor surface may be closely controlled, the stems adapt themselves to the configuration of the rotor surface, and superior rotor surface finishing is achieved.

An additional object of the invention is to provide a method and apparatus for finishing brake rotor surfaces by a honing operation utilizing abrasive elements mounted upon flexible resilient stems wherein the abrasive elements may be selectively rotated about an axis of rotation coincident to, or offset from, the axis of brake rotor rotation to vary the relative path of movement of the elements on the rotor surface.

A further object of the invention is to provide a method and apparatus for machining vehicle brake rotors by honing utilizing abrasive elements mounted upon flexible resilient stems wherein the abrasive elements may be so translated relative to the rotor surface as to produce a basket weave pattern on the rotor surface which eliminates excessive brake pad wear and produces superior braking characteristics.

Yet another object of the invention is to provide a method and apparatus for machining the pad engaging surfaces of high strength aluminum alloy vehicle brake rotors wherein hones consisting of abrasive elements mounted upon flexible stems are rotated about an axis and brought into engagement with the rotor surface, and sufficient temperatures can be generated at the rotor surface to produce a wear resistant oxidized layer on the rotor surface.

SUMMARY OF THE INVENTION

A vehicle brake rotor or disc is conventionally formed of a high strength aluminum alloy and consists of a hub having mounting holes formed therein for attachment of the hub to the vehicle wheel whereby the hub will rotate about the axis of wheel rotation. A radial flange extending from the hub periphery includes a circular periphery and opposite sides which are machined to a smooth finish for engagement by the brake pads mounted within a pad holding caliper encompassing the rotor flange. The invention pertains to the finishing of the rotor flange pad engaging surfaces.

In accord with the invention, the machining of the rotor pad engaging surfaces is a honing operation accomplished by a plurality of small abrasive elements each mounted upon a flexible resilient stem. The stems are mounted in a hone holder having an axis of rotation which, in the disclosed embodiments, is parallel to the length of the stems. During the machining of the rotor surfaces, the rotors are rotated, and the hone holder is likewise rotated and the abrasive elements are brought into engagement with the rotor surface to be finished. The degree of force engaging the abrasive elements to the rotor surface is closely controlled, which determines the degree of deformation occurring in the stems and the pressure which the abrasive element engages the surface which controls the rate of machining and the temperature of the rotor surface.

The abrasive elements will move in a circular path concentric to the hone holder axis, and in one embodiment the aligning of the axes of rotation of the rotor and the hone holder will cause the abrasive elements to rotate in circles concentric to the axis of rotor rotation and machine the rotor surface with a plurality of concentric circular movements.

In a preferred arrangement, the axis of hone holder rotation is radially offset with respect to the rotor rotative axis in a parallel manner whereby the abrasive elements move in a circular path non-concentric to the axis of rotor rotation and a basket weave type of pattern is formed upon the rotor pad engaging surface. This type of pattern has favorable pad wearing characteristics and reduces braking noise and wear-in problems. Also, when the hone holder axis of rotation is offset relative to the rotor axis, it is possible to simultaneously hone both sides of the rotor flange to achieve the desired surface.

In the practice of the invention, because of the close control of the honing operation achievable by the use of the small hone elements supported upon flexible and resilient stems, the fineness of the surface machining can be closely regulated, and the temperatures occurring at the rotor flange surfaces can be controlled. The greater the "pressure" of the abrasive elements on the rotor surface, the faster the rate of machining, and the higher temperatures achieved. By the practice of the invention, it is possible to produce surface temperatures on the rotor pad engaging surfaces which permit a high, wear resistant, aluminum oxide layer to occur, and as the formation of this oxidized layer can be closely regulated during the honing operation, and will pre-exist on the brake rotor pad engaging surfaces prior to installation of the rotor on the vehicle, the practice of the invention to produce a wear resistant oxidizing surface on aluminum rotors eliminates the heretofore haphazard and uncontrolled generation of such oxidized surfaces and galling and other objectionable characteristics which previously occurred can be eliminated.

BRIEF DESCRIPTION OF THE DRAWINGS

The aforementioned objects and advantages of the invention will be appreciated from the following description and accompanying drawings wherein:

FIG. 1 is an elevational view, partially sectioned, illustrating the opposed pad engaging surfaces defined upon a brake rotor being simultaneously machined by hone elements supported upon flexible and resilient stems in accord with the invention, FIG. 2 is an elevational sectional view taken along Section 2—2 of FIG. 1, FIG. 3 is a partial detail view of a rotor pad engaging surface upon being treated by the apparatus shown in FIGS. 1 and 2 illustrating the basket weave pattern, and FIG. 4 is an elevational, diametrical, sectional view of another arrangement of a brake rotor and a hone holder utilizing the concepts of the invention wherein the axes of rotation of the rotor and hone holder coincide.

DESCRIPTION OF THE PREFERRED EMBODIMENTS

With reference to FIGS. 1 and 2, a typical vehicle wheel rotor or disc brake 10 is illustrated. Such a rotor includes a hub 12 having a central hole 14 concentric to the hub and entire rotor, the center of which constitutes the axis of rotor rotation. Attachment holes 16 are usually formed in the hub 12 whereby the rotor may be attached to a vehicle wheel by bolts, as is well known and conventional.

A radially extending flange 18 depends outwardly from the hub and has a circular periphery and opposed sides 20 and 22. The flange 18 is of a planar configuration, as are the sides 20 and 22, and the sides are adapted to be engaged by the brake pads of a disc brake assembly as mounted upon a caliper, not shown, as well known in the automotive braking art.

Usually, the rotor 10 is formed of a high strength aluminum alloy capable of dissipating heat, and cooling fins and other configurations, not shown, may be defined on the wheel rotor hub to aid in the dissipation of heat generated during braking.

Machining of the pad engaging side surfaces 20 and 22, in accord with the invention, is accomplished by abrasive hone elements mounted upon rotating holders. With reference to FIG. 1, the hone holder 24 machines the flange side 20 while the hone holder 26 machines the flange side surface 22. The hone holder 24 is mounted upon a rotating shaft 28, while the hone holder 26 is mounted upon rotating shaft 30. The shafts 28 and 30 are rotatably driven by motors, not shown, and rotate in the direction indicated by the arrows.

The hone holders 24 and 26 are identical in construction, and the end of the associated drive shaft includes a nut 32, such as shown in FIG. 4, whereby the hone holder will directly rotate with its associated shaft. Each hone holder includes a face 34, FIG. 4, and a plurality of resilient flexible stems 36, such as formed of nylon or other synthetic material, are imbedded within the associated holder and extend from the associated holder face 34. At the outer end of each stem 36, an abrasive element 38 is mounted. The elements 38 may include carborundum components and are capable of producing a honing machining action when passed across a wheel rotor flange side surface.

A preferred arrangement for machining the wheel rotor flange sides is shown in FIGS. 1 and 2. In this relationship, the wheel rotor 10 is mounted in a suitable chuck or holder, not shown, whereby the rotor 10 will rotate about its nominal axis of rotation as represented by the center of the central hole 14. The particular form of the apparatus for holding the wheel rotor 10 constitutes no part of the instant invention, and any conventional apparatus for holding the wheel rotor 10 during the machining of the sides 20 and 22 may be employed. The hone holders 24 and 26 are positioned relative to the flange 18 as will be appreciated from FIGS. 1 and 2. The shafts 28 and 30 will be axially coincident and aligned, and the axis of the shafts 28 and 30 will be parallel to the axis of rotation of the rotor 10, but laterally or radially offset with respect thereto. The hone holders 24 and 26 and their associated shafts 28 and 30, respectively, will be mounted on rotating spindles, not shown, capable of limited axial displacement whereby each of the hone holders 24 and 26 may be moved to the left or right as viewed in FIG. 1. Accordingly, upon the wheel rotor 10 being rotated the hone holders 24 and 26 will be axially displaced toward the flange 18 whereby the hone elements 38 mounted upon hone holder 24 will engage the flange side surface 20 while the abrasive elements 38 mounted upon the hone holder 26 will engage the flange side surface 22. The hone holders 24 and 26 will be axially moved toward each other whereby the desired force of engagement between the abrasive elements 38 and the associated flange side surfaces 20 and 22 will be achieved. Because of the abrasive character of the elements 38, a honing and polishing action on the flange side surfaces 20 and 22 will occur, and the path of movement of the abrasive elements 38 over the engaged flange side will produce a pattern such as shown in FIG. 3 wherein overlapping paths of movement of the abrasive elements on the associated flange side surface produce a basket weave pattern 40. Such a basket weave pattern as formed upon the flange brake pad engaging sides produces excellent braking characteristics with a minimum of wear and noise.

As will be appreciated from FIG. 2, it will be noted that the configuration of the stems 36 and abrasive elements 38 as extending from the associated hone holder face 34 is such that the entire face 20 or 22 will be engaged by the abrasive elements and the entire radial dimension of the associated surface machined. By axially positioning the hone holder, the "pressure" which the abrasive elements 38 engage the associated flange side may be adjusted, the greater the pressure the more deformation occurs within the flexible and resilient stems 36, and the more extensive the metal removing process.

Upon the machining of the side surfaces 20 and 22 being terminated, the hone holders 24 and 26 are axially displaced away from each other and the wheel rotor 10 may be removed from its associated holder and a new wheel rotor positioned for machining between the holders 24 and 26.

FIG. 4 illustrates a variation in the relationship between a wheel rotor and a hone holder, and components identical to those previously described are indicated by pried reference numerals. In FIG. 4, a chuck plate 42 supports a positioning block 44 which is located within the hub 12' of the wheel rotor 10', and the wheel rotor side 22' may rest directly upon the chuck plate 42. The chuck plate 42 is rotated by a driven shaft 46, and the hone holder 24' is rotated by shaft 28'. Flexible resilient stems 36' extend from the hone holder face 34', and abrasive elements 38' mounted on the ends of the stems directly engage the wheel rotor surface 20' for the honing and machining thereof.

In the embodiment of FIG. 4, the hone holder 24' is capable of moving upwardly or downwardly, and as it is brought downwardly while rotating, the abrasive elements 38' will machine the wheel rotor side surface 20'. The axis of the shaft 46 is coaxial with the axis of shaft 28', and in this relationship between the hone holder and the wheel rotor, the abrasive elements 38' will contact the wheel rotor side surface 20' in concentric circle paths of movement. As will be appreciated from the drawings, the abrasive elements 38' in adjacent rows are offset relative to each other so that this overlapping permits a smooth and highly finished surface to be machined on the wheel rotor flange.

As mentioned above, the pressure of the abrasive elements on the flange side surfaces during honing is controlled by the relative position of the hone holder and flange. Of course, the greater the pressure applying the abrasive elements to the flange side surface, the faster the generation of heat will occur, as well as the greater the extent of machining in a given time, and due to the nature of the hone holder structure, it is possible to accurately control the temperature occurring at the wheel rotor side surfaces 20 and 22 during honing.

It is preferable that the rotor side surfaces 20 and 22 each have a wear resistant, aluminum oxide surface to minimize wheel rotor wear, and produce superior braking characteristics and extended pad life. By controlling the temperature occurring at the flange side surfaces 20 and 22 by the relative positioning of the hone holders to the flange side surfaces, it is possible for the abrasive elements 38 to simultaneously hone and machine the side surfaces 20 and 22 at such a temperature as to produce the desired oxidized wear resistant surface on the flange side surfaces, and hence, the practice of the invention simultaneously permits the wheel rotor side surfaces 20 and 22 to be accurately and smoothly machined and have wear resistant, oxidized surfaces formed upon the aluminum flange 18 and upon installing such a wheel rotor upon a vehicle, it is not necessary to "break-in" the wheel rotors and the desired wear resistant, oxidized surface on the pad engaging flange surfaces will be uniform, controlled, and galling problems which may occur due to the previously employed haphazard break-in period are eliminated.

It is appreciated that the inventive concepts may be practiced with modifications to the invention as disclosed without departing from the spirit and scope of the invention. For instance, the configuration of the hone holders may vary, such as the length of the flexible and resilient stems being at right angles to the axis of hone holder rotation, rather than substantially parallel thereto, and such modifications are considered to be within the scope of the instant invention.

I claim:
1. The method of finishing the brake pad engaging surfaces of disc brake rotors wherein the rotor includes a hub having an axis of rotation and a pair of annular brake pad engaging surfaces defined on the opposite sides of a flange radially extending from the hub comprising the steps of:
 (a) rotating the brake rotor and flange about their axis of rotation;
 (b) rotating a plurality of abrasive hone elements mounted upon flexible resilient stems about an axis;
 (c) engaging said rotating abrasive hone elements with a pad engaging surface in such a manner as to deflect said stems of said elements to finish the pad engaging surface to the desired surface finish, and
 (d) removing said hone elements from the engaged pad engaging surface upon the desired pad engaging surface finish being attained.

2. The method of finishing the brake pad engaging surfaces of brake rotors as in claim 1 including the step of maintaining the abrasive hone elements in engagement with the pad engaging surface being finished a sufficient duration to permit the pad engaging surface to attain an atmosphere oxidizing temperature wherein a wear resistant layer of oxidized material is defined upon the pad engaging surface.

3. The method of finishing the brake pad engaging surfaces of brake rotors as in claim 2, the rotor and pad engaging surfaces being formed of a high strength aluminum alloy.

4. The method of finishing the brake pad engaging surfaces of brake rotors as in claim 1 wherein the axis of rotation of the brake rotor and flange is coincident with the axis of rotation of said hone elements wherein said hone elements engage the associated pad engaging surface in a concentric manner.

5. The method of finishing the brake pad engaging surfaces of brake rotors as in claim 1, wherein the axis of rotation of the brake rotor, flange and pad engaging surface is offset with respect to the axis of rotation of said hone elements and spaced therefrom wherein said hone elements engage the pad engaging surface in an overlapping pattern non-concentric to the axis of rotation of the brake rotor and pad engaging surfaces.

6. The method of finishing the brake pad engaging surfaces of brake rotors as in claim 5, the path of movement of said hone elements on the pad engaging surface overlapping to form a basket weave pattern.

7. The method of finishing the brake pad engaging surfaces of brake rotors as in claim 5, wherein both pad engaging surfaces are simultaneously engaged by rotating hone elements mounted upon flexible stems.

8. The method of finishing the brake pad engaging surfaces of brake rotors as in claim 7, wherein the hone elements engaging the pad engaging surfaces of a common rotor are each mounted upon a holder located on opposite sides of the rotor flange rotating about axes substantially parallel to the axis of rotor rotation.

9. Apparatus for finishing the pad engaging surfaces of a brake rotor having an axis of rotation, a hub, an annular flange radially extending from the hub having opposite sides and an annular pad engaging surface defined upon each flange side comprising, in combination, a rotatable rotor holder having an axis of rotation for holding a brake rotor and rotating the brake rotor about its axis of rotation, a rotary hone having an axis of rotation comprising a holder having a plurality of flexible elongated stems extending therefrom each having a free end and an abrasive hone element affixed to each stem free end, said hone elements engaging a pad engaging surface during rotation of the rotor and hone to produce the desired finish upon the engaged pad engaging surface.

10. In an apparatus for finishing the pad engaging surfaces of a brake rotor as in claim 9, the axis of rotor rotation being coincident with the axis of rotation of said hone.

11. In an apparatus for finishing the pad engaging surfaces of a brake rotor as in claim 9, the axes of rotation of the rotor and said hone being substantially parallel and offset with respect to each other.

12. In an apparatus for finishing the pad engaging surfaces of a brake rotor as in claim 11, wherein the length of said flexible stems is substantially parallel to the axis of rotation of the associated hone holder.

13. In an apparatus for finishing the pad engaging surfaces of a brake rotor as in claim 9, a rotary hone holder located adjacent each flange side and pad engaging surface, said abrasive elements of said hone holder simultaneously engaging both pad engaging surfaces.

14. In an apparatus for finishing the pad engaging surfaces of a brake rotor as in claim 13, the length of said flexible stems being substantially parallel to the axis of rotation of the associated hone holder, a rotary hone holder being located adjacent each flange side and pad engaging surface, said abrasive elements of said hone holders simultaneously engaging both pad engaging surfaces, and the axes of rotation of said hone holders being coincident and substantially parallel to and offset with respect to the brake rotor axis of rotation.

* * * * *